(12) United States Patent
Okamoto (10) Patent No.: US 7,103,216 B2
(45) Date of Patent: Sep. 5, 2006

(54) COLOR CHART AND COLOR CONVERSION DEFINITION CREATING METHOD

(75) Inventor: Takahiro Okamoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 657 days.

(21) Appl. No.: 09/901,665

(22) Filed: Jul. 11, 2001

(65) Prior Publication Data

US 2002/0080374 A1 Jun. 27, 2002

(30) Foreign Application Priority Data

Jul. 11, 2000 (JP) ............................ 2000-209460

(51) Int. Cl.
*H04N 1/46* (2006.01)
*G06K 9/00* (2006.01)

(52) U.S. Cl. .................... 382/167; 358/515; 358/520; 358/525; 358/530

(58) Field of Classification Search ................ 358/524, 358/522, 523, 530, 500, 501, 515, 517, 518, 358/520, 525; 382/167, 162
See application file for complete search history.

(56) References Cited

U.S. PATENT DOCUMENTS

| | | | | |
|---|---|---|---|---|
| 6,023,351 A | * | 2/2000 | Newman | ................... 358/524 |
| 6,798,462 B1 | * | 9/2004 | McIntyre et al. | ........... 348/708 |
| 2001/0055128 A1 | * | 12/2001 | Lee et al. | ................... 358/515 |
| 2002/0122190 A1 | * | 9/2002 | Harrington | .................. 358/1.9 |
| 2003/0228055 A1 | * | 12/2003 | Kanagawa et al. | ......... 382/162 |
| 2004/0105581 A1 | * | 6/2004 | Sawada | ...................... 382/162 |
| 2004/0170319 A1 | * | 9/2004 | Maurer | ....................... 382/167 |
| 2004/0223172 A1 | * | 11/2004 | Yoshizawa et al. | .......... 358/1.8 |

FOREIGN PATENT DOCUMENTS

| | | |
|---|---|---|
| JP | 10-164352 | 6/1998 |
| JP | 2001-45318 | 2/2001 |

* cited by examiner

*Primary Examiner*—Jerome Grant, II
(74) *Attorney, Agent, or Firm*—Sughrue Mion, PLLC (57) ABSTRACT

A color chart includes color patches associated with all vertexes of a rectangular parallelepiped defined by a base coloring amount ($QC_b$, $QM_b$, $QY_b$) comprising combinations of minimum coloring amounts $QC_b$, $QM_b$ and $QY_b$ of monochromes of cyan, magenta and yellow in a coloring amount space represented by three axes of coloring amounts of cyan, magenta and yellow, a maximum coloring amount $QC_{max}$ of monochrome of cyan, a maximum coloring amount $QM_{max}$ of monochrome of magenta M, and a maximum coloring amount $QY_{max}$ of monochrome of yellow Y in the coloring amount space, and in addition a color patch associated with an intermediate point located between two vertexes on a straight line coupling the two vertexes with one another, even if any two vertexes of the rectangular parallelepiped are selected.

7 Claims, 8 Drawing Sheets

COLOR CHART AND COLOR CONVERSION DEFINITION CREATING METHOD

BACKGROUND OF THE INVENTION

1. Field of the Invention

The present invention relates to a color conversion definition creating method of creating a color conversion definition for converting first color data representative of coordinate points within a first color space depending on an input device for obtaining image data through entering an image into second color data representative of coordinate points within a second color space independent of a device, and a color chart for creating the color conversion definition, in which a plurality of mutually different colors of color patches are arranged.

2. Description of the Related Art

Colors of lights emitted from the respective points of an image are provided as data in form of coordinate values of three-dimensional color space, such as RGB (R: red, G: green, B: blue), CMY (C: cyan, M: magenta, Y: yellow), XYZ, and $L^*a^*b^*$, in connection with the fact that human eyes have three sorts of cell sensitive to three colors of red, green and blue. For example, a scanner reads lights emitted from the respective points of an image through filters of red, green and blue to create output data (R, G, B) represented by the coordinate values of the color space RGB.

The output data (R, G, B) depends on spectral distribution characteristics of the above-mentioned filters and a photo detector unit of the scanner. And thus the output data (R, G, B) is data having a device dependency inherent in the scanner. Because of the device dependency, the output data of the scanner is inadequate for using in another image apparatus such as a printer per se. However, in the event that there is prepared a color conversion definition defining the association between the output data (R, G, B) of the scanner and color data free from device dependency such as calorimetric value data ($L^*$, $a^*$, $b^*$) represented by coordinate values of a color space $L^*a^*b^*$, and in addition, also for another image apparatus, there is prepared a color conversion definition defining the association between color data treated by the another image apparatus and calorimetric value data, a combination of those color conversion definitions makes it possible to convert the output data (R, G, B) of the scanner into the color data of a color space involved in device dependency of another image apparatus through calorimetric value data ($L^*$, $a^*$, $b^*$) free from device dependency.

The association between the output data of the scanner and the calorimetric value data can be created as follows. First, a laser printer is used to perform an exposure on for example a reversal film (RV), so that a color chart having a plurality of patches is created. The scanner reads transmitted lights through the patches of the color chart so as to create output data (R, G, B) of the scanner associated with the patches. And the transmitted lights through the patches of the color chart are measured so as to create calorimetric value data ($L^*$, $a^*$, $b^*$) associated with the patches. In this manner, the patches are used to associate the created output data (R, G, B) of the scanner with the created calorimetric value data ($L^*$, $a^*$, $b^*$), and this correspondence is expressed on an approximate basis using for example a polynomial expression to create a color conversion definition for converting the general output data (R, G, B) into calorimetric value data ($L^*$, $a^*$, $b^*$).

Usually, an area defined by a plurality of color patches of a color chart, which area is referred to as a color reproduction area (gamut) hereinafter, does not include an entire area on which the reversal film (RV) is able to inherently form a color, and a dynamic range of a scanner is broader than the area on which the reversal film (RV) is able to inherently form a color. For this reason, the color conversion definition at the exterior of the color reproduction area of the color chart is created in such a manner that for example, the polynomial expression, which is used for the association between the calorimetric value data ($L^*$, $a^*$, $b^*$) and the output data (R, G, B) of the scanner, is simply expanded to the exterior of the finite area.

The color conversion definition is created in the manner as mentioned above. However, according to the former color chart such as IT8 chart used for creating such a color conversion definition, it is difficult to create the color conversion definition with great accuracy, and particularly it is difficult to create the color conversion definition with great accuracy in the vicinity of the boundary of the color reproduction area of the color chart and at the exterior of the color reproduction area of the color chart.

SUMMARY OF THE INVENTION

In view of the foregoing, it is an object of the present invention to provide a color chart suitable for creating a great accuracy of color conversion definition, and a color conversion definition creating method of performing a creation of a color conversion definition using such a color chart.

To achieve the above-mentioned object, the present invention provides a color chart for creating a color conversion definition for converting first color data representative of coordinate points in a first color space depending on an input device for entering image to obtain image data into second color data representative of coordinate points in a second color space independent of devices, in which a plurality of color patches different in color is arranged, wherein said color chart includes color patches associated with all vertexes of a rectangular parallelepiped defined by a base coloring amount ($QC_b$, $QM_b$, $QY_b$) comprising combinations of minimum coloring amounts $QC_b$, $QM_b$ and $QY_b$ of monochromes of cyan, magenta and yellow in a coloring amount space represented by three axes of coloring amounts of cyan, magenta and yellow, a maximum coloring amount $QC_{max}$ of monochrome of cyan C, a maximum coloring amount $QM_{max}$ of monochrome of magenta M, and a maximum coloring amount $QY_{max}$ of monochrome of yellow Y in the coloring amount space, and in addition a color patch associated with an intermediate point located between two vertexes on a straight line coupling the two vertexes with one another, even if any two vertexes of the rectangular parallelepiped are selected.

To achieve the above-mentioned object, the present invention provides a color conversion definition creating method of creating a color conversion definition for converting first color data representative of coordinate points in a first color space depending on an input device for entering image to obtain image data into second color data representative of coordinate points in a second color space independent of devices, wherein a color chart is adopted to obtain the second color data representative of coordinate points in the second color space associated with a plurality of color patches constituting said color chart, and also to obtain the first color data representative of coordinate points in the first color space associated with a plurality of color patches constituting said color chart, through inputting said color chart to said input device, said color chart includes color patches associated with all vertexes of a rectangular parallelepiped defined by a base coloring amount ($QC_b$, $QM_b$, $QY_b$) comprising combinations of minimum coloring amounts $QC_b$, $QM_b$ and $QY_b$ of monochromes of cyan, magenta and yellow in a coloring amount space represented by three axes of coloring amounts of cyan, magenta and yellow, a maximum coloring amount $QC_{max}$ of monochrome of cyan C, a maximum coloring amount $QM_{max}$ of monochrome of magenta M, and a maximum coloring amount $QY_{max}$ of monochrome of yellow Y in the coloring amount space, and in addition a color patch associated with an intermediate point located between two vertexes on a straight line coupling the two vertexes with one another, even if any two vertexes of the rectangular parallelepiped are selected, and the color conversion definition is created by association of said first color data with said second color data.

The color chart includes color patches associated with all vertexes of the rectangular parallelepiped, and in addition a color patch associated with the intermediate point. Thus, there exist much color data in the vicinity of the boundary of the color area represented by the rectangular parallelepiped. According to a color conversion definition creating method of the present invention, the color chart as mentioned above is used to create a color conversion definition. This feature makes it possible to create the color conversion definition with greater accuracy as compared with the conventional color conversion definition creating method, particularly in the vicinity of the boundary of the color reproduction area of the color chart and outside the color reproduction area of the color chart.

DETAILED DESCRIPTION OF PREFERRED EMBODIMENTS

Embodiments of the present invention will be described with reference to the accompanying drawings.

First, before explanation of a color conversion definition creating method according to the present embodiment of the present invention, there will be explained an image processing system using a color conversion definition created by the color conversion definition creating method according to the present embodiment of the present invention.

Figure 1:
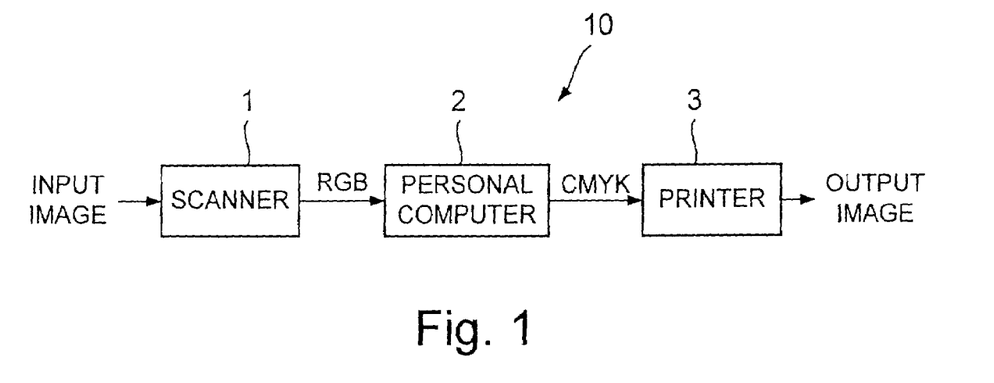
FIG. 1 is a structural view of an image processing system by way of example.

FIG. 1 is a structural view of an image processing system by way of example.

An image processing system 10 comprises a scanner 1, a personal computer 2 and a printer 3. The scanner 1 reads, for example, an input image of a RV to create RGB image data that are subjected to a color separation into RGB three colors representative of the input image thus read. The RGB image data are fed to the personal computer 2. The personal computer 2 converts the RGB image data into CMYK image data that are subjected to a color separation into CMYK four colors, where K denotes black. The CMYK image data are fed to the printer 3. The printer 3 ejects ink on a sheet in accordance with the CMYK image data to form an output image.

Figure 2:
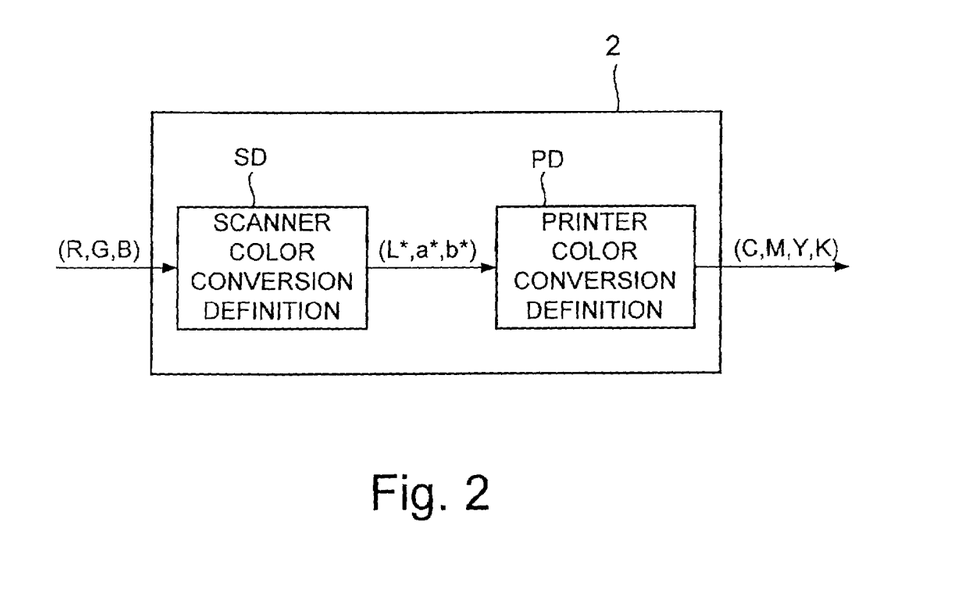
FIG. 2 is a view showing a state that image data is converted in a personal computer.

FIG. 2 is a view showing a state that image data is converted in a personal computer.

A personal computer 2 shown in FIG. 2 has a color conversion definition SD for the scanner 1, which defines the association between output data (R, G, B) of the scanner 1 and calorimetric value data (L*, a*, b*), and a color conversion definition PD for the printer 3, which defines the association between the calorimetric value data (L*, a*, b*) and input data (C, M, Y, K) of the printer 3.

The personal computer 2 receives the RGB image data outputted from the scanner 1. The RGB image data are converted into L*a*b* image data in accordance with the color conversion definition SD for the scanner 1. The L*a*b* image data thus converted are converted into CMYK image data for the printer 3 in accordance with the color conversion definition PD for the printer 3. The CMYK image data thus converted are fed to the printer 3. Thus, the use of the color conversion definition SD for the scanner 1 and the color conversion definition PD for the printer 3 converts the output data (R, G, B) of the scanner 1 via the calorimetric value data (L*, a*, b*) of the device non-dependency into the input data (C, M, Y, K) of the printer 3, so that the color of the input image entered by the scanner 1 shown in FIG. 1 is reproduced on the output image outputted by the printer 3.

A color conversion definition creating method of the present embodiment is a method of creating the color conversion definition SD for the scanner 1. An RGB color space representative of output data (R, G, B) of the scanner 1, which is defined by the color conversion definition SD, is shown in FIG. 3, and an L*a*b* color space representative of calorimetric value data (L*, a*, b*) is shown in FIG. 4.

Figure 3:
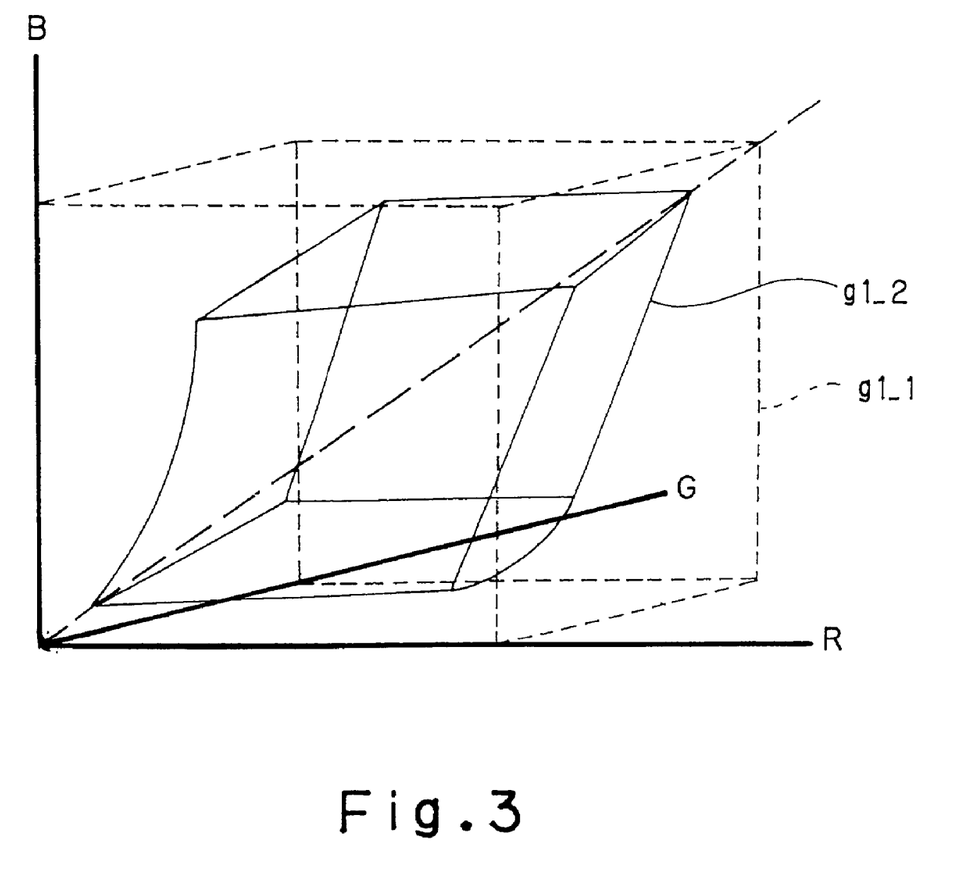
FIG. 3 is a view representative of an RGB color space defining output data of a scanner.

FIG. 3 is a view representative of an RGB color space defining output data of a scanner.

An RGB color space shown in FIG. 3 is a space in which coordinates are defined by three basic axes of R-axis, G-axis and B-axis. In this space, the color conversion definition SD is created in a hexahedron-like shaped first definition area g1_1 encircled with dotted lines in FIG. 3. The first definition area g1_1 is broader than a dynamic range of the scanner 1, so that all the RGB data, which are outputted from the scanner 1, are included in the first definition area g1_1. In FIG. 3, an area having a distorted hexahedron represented by solid lines, which is included in the first definition area g1_1, is denoted by a first color reproduction area g1_2 which is the intrinsic color reproduction area of the RV.

Figure 4:
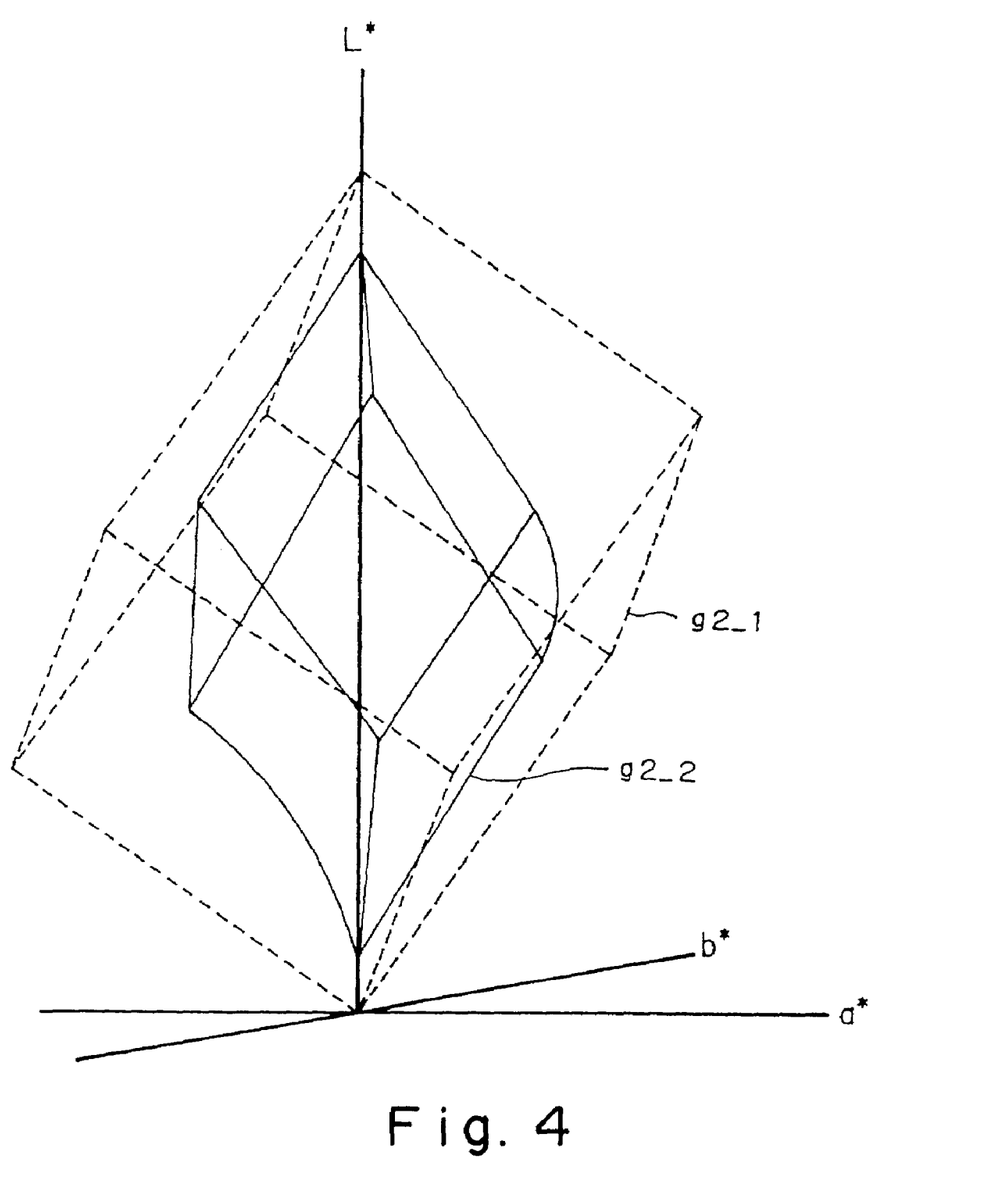
FIG. 4 is a view representative of an L*a*b* color space defining calorimetric value data.

FIG. 4 is a view representative of an L*a*b* color space defining calorimetric value data.

An L*a*b* color space shown in FIG. 4 is a space in which coordinates are defined by three basic axes of L*-axis, a*-axis and b*-axis. A hexahedron-like shaped second definition area g2_1 encircled with dotted lines in FIG. 4 represents an area corresponding to the first definition area g1_1 of the RGB color space. In FIG. 4, a second color reproduction area g2_2 having a distorted hexahedron represented by solid lines, which is included in the second definition area g2_1, represents the intrinsic color reproduction area of the RV in the L*a*b* color space.

The color conversion definition SD for the scanner 1 shows the association between a plurality of first color data in the first definition area g1_1 of the RGB color space and a plurality of second color data in the second definition area g2_1 of the L*a*b* color space. Usually, the color conversion definition SD is created for each of the plurality of first color data represented by a plurality of coordinate points arranged as a lattice of the first definition area g1_1 of the RGB color space. Hereinafter, each of the plurality of coordinate points arranged as a lattice, by which the color conversion definition SD is defined, is referred to as a point of interest.

The color conversion definition SD is created in accordance with a color conversion definition creating method of the present embodiment of the present invention, which will be described later. At that time, for example, an exclusive chart for the present embodiment shown in FIG. 5 is used.

Figure 5:
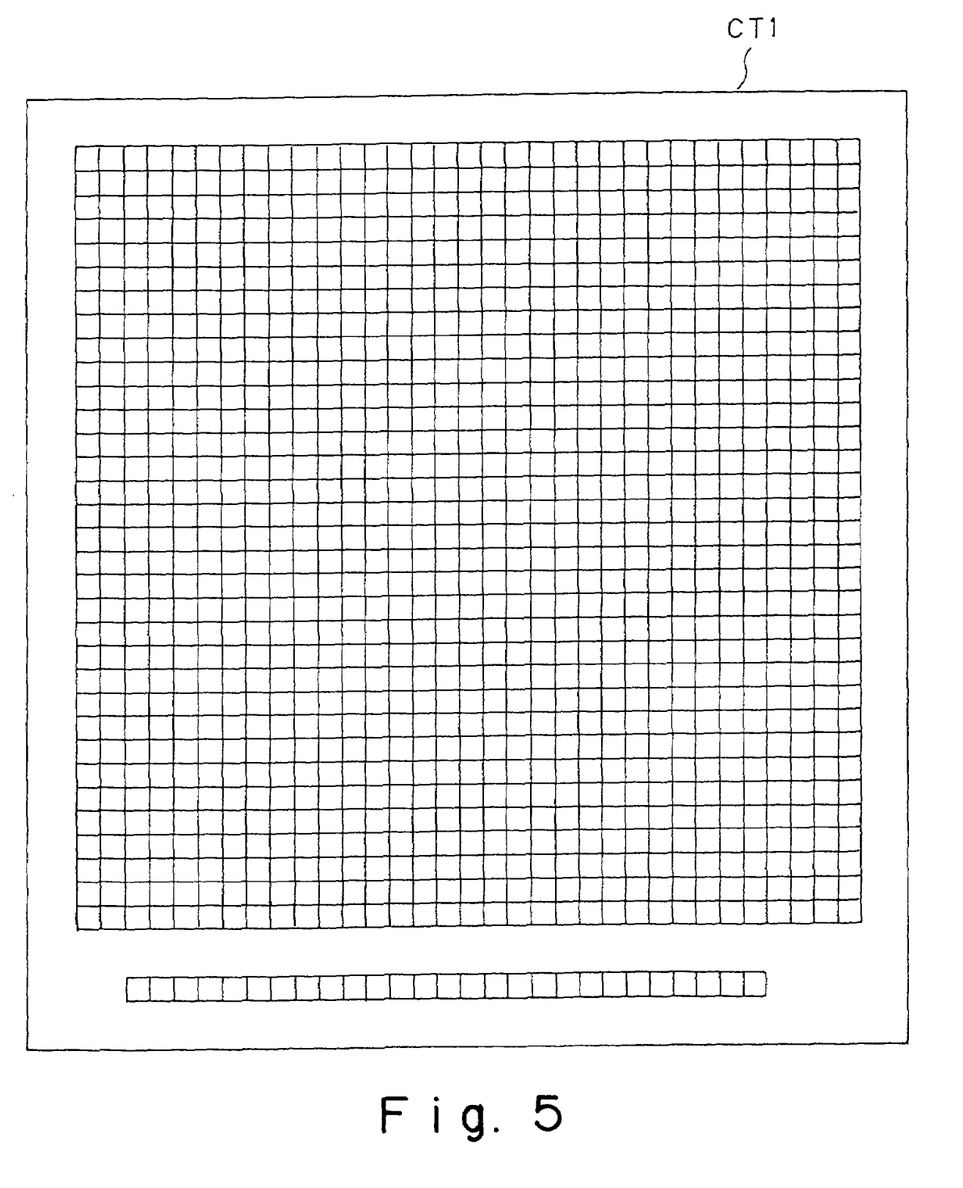
FIG. 5 is an exclusive chart for the present embodiment.
Figure 6:
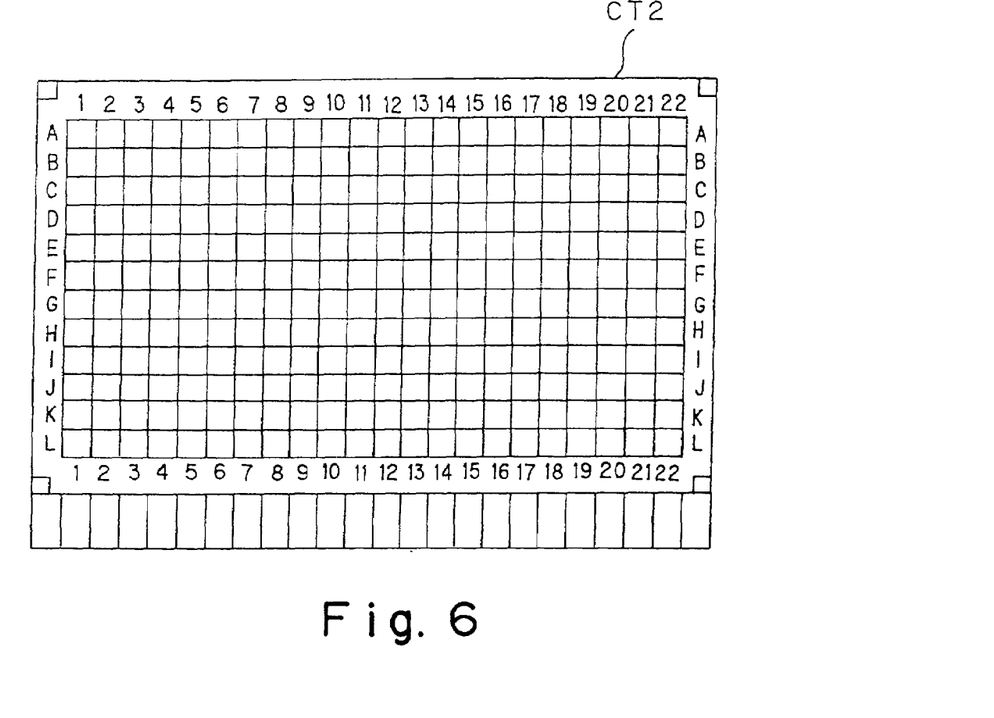
FIG. 6 is a view showing the former IT8 chart.

FIG. 5 is an exclusive chart for the present embodiment. FIG. 6 is a view showing the former IT8 chart.

First, there will be explained the former IT8 chart. The IT8 chart shown in FIG. 6 is a color chart having a total 288 colors of color patches comprising a main part consisting of lines A to L and columns 1 to 22, and a gray scale of one line and 22 columns, which is shown below FIG. 6. Color of each of the color patches constituting the main part comprises: color solid colors 144 colors, which vary in hue for each line and are different in lightness and saturation for each column, of an area defined with lines A to L and columns 1 to 12; colors of a primary color scale, in which columns correspond to C, M, Y, K, R, G and B colors, respectively, of an area defined with lines A to L and columns 13 to 19; maker inherent colors, which are optionally arranged by a maker, of an area defined with lines A to L and columns 20 to 22.

An exclusive chart CT1 shown in FIG. 5 is a color chart including color patches of total 729 colors, which comprises a main part of 33 lines×33 columns appearing at the upper side of FIG. 5 and a gray scale of one line×27 columns appearing at the lower side of FIG. 5.

Figure 7:
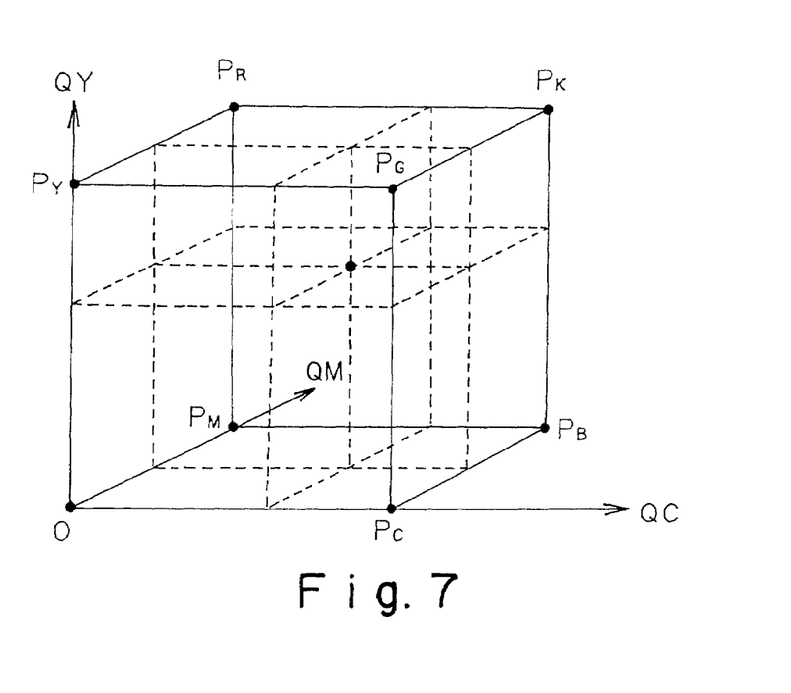
FIG. 7 is a view showing a CMY coloring amount space defining a coloring amount of each coloring matter of CMY colors constituting color patches of the exclusive chart for the present embodiment.

The color patches of the exclusive chart are printed on the RV by a printer in accordance with 729 (729=9³) ways of data (QC, QM, QY) represented by coordinate points in a CMY coloring amount space shown in FIG. 7.

FIG. 7 is a view showing a CMY coloring amount space defining a coloring amount of each coloring matter of CMY colors constituting color patches of the exclusive chart for the present embodiment.

FIG. 7 shows a three-dimensional CMY coloring amount space in which a QC-axis, a QM-axis and a QY-axis are established in form of a basic axis. Coloring amount data representative of a set of coloring amount of each color of CMY is represented by coordinate values in the CMY coloring amount space. In FIG. 7, the maximum rectangular parallelepiped in the CMY coloring amount space denotes an area including 729 ways of data associated with the patches of the exclusive chart for the present embodiment. The maximum coloring amounts of monochromes of cyan C, magenta M and yellow Y in the CMY coloring amount space are denoted by QCmax, QMmax and QYmax, respectively. The minimum coloring amounts of monochromes of cyan C, magenta M and yellow Y in the CMY coloring amount space are denoted by $QC_b$, $QM_b$ and $QY_b$, respectively. The rectangular parallelepiped has vertexes of a base coordinate point O defined by coordinates ($QC_b$, $QM_b$, $QY_b$) representative of a highlight, a coordinate point Pc defined by coordinates ($QC_{max}$, $QM_b$, $QY_b$) representative of the maximum coloring amount of a saturated color C, a coordinate point $P_M$ defined by coordinates ($QC_b$, $QM_{max}$, $QY_b$) representative of the maximum coloring amount of a saturated color M, a coordinate point $p_Y$ defined by coordinates ($QC_b$, $QM_b$, $QY_{max}$) representative of the maximum coloring amount of a saturated color Y, a coordinate point $P_R$ defined by coordinates ($QC_b$, $QM_{max}$, $QY_{max}$) representative of the maximum coloring amount of a saturated color R, a coordinate point $P_G$ defined by coordinates ($QC_{max}$, $QM_b$, $QY_{max}$) representative of the maximum coloring amount of a saturated color G, a coordinate point $P_B$ defined by coordinates ($QC_{max}$, $QM_{max}$, $QY_b$) representative of the maximum coloring amount of a saturated color B, and the maximum coloring amount point $P_K$ defined by coordinates ($QC_{max}$, $QM_{max}$, $QY_{max}$) representative of a shadow.

The 729 ways of data are defined by coordinate values of 729 ways of coloring amount obtained through a combination of 9 segments of coloring amount dividing coloring amounts $QC_b$ to $QC_{max}$ equally in a C-axis direction, 9 segments of coloring amount dividing coloring amounts $QM_b$ to $QM_{max}$ equally in an M-axis direction, and 9 segments of coloring amount dividing coloring amounts $QY_b$ to $QY_{max}$ equally in an Y-axis direction, respectively. The 729 ways of data defined by those coordinate values include coloring amount data associated with the vertexes of the above-mentioned rectangular parallelepiped, and in addition, even in the event that any two vertexes of the rectangular parallelepiped are selected, include coloring amount data associated with the intermediate point located between the selected two vertexes on the straight line coupling the selected two vertexes. The intermediate points are represented, in FIG. 7, by points except 8 vertexes of the above-mentioned rectangular parallelepiped, of points wherein at least two lines shown in FIG. 7 intersect.

The IT8 chart has, as mentioned above, color patches of primary color scales corresponding to colors of C, M, Y, K, R, G and B, respectively. For this reason, while there exist a lot of data associated with those color patches on the straight lines between the base coordinate point O and the respective points $P_C$, $P_M$, $P_Y$, $P_K$, $P_R$, $P_G$, $P_B$ in the above-mentioned rectangular parallelepiped in the above-mentioned CMY coloring amount space, there exist no data associated with those color patches between the point $P_K$ and the respective points $P_C$, $P_M$, $P_Y$, $P_R$, $P_G$, $P_B$ representative of the above-mentioned saturated colors.

On the other hand, the exclusive chart for the present embodiment includes the color patches associated with all the vertexes of the rectangular parallelepiped and the respective intermediate points. Thus, there exist a lot of data associated with the color patches of the exclusive chart on a boundary of the color areas represented by the rectangular parallelepiped and in the vicinity of the boundary.

Incidentally, according to the present embodiment, the color patches of the exclusive chart are printed making the best use of the color reproduction area (the color gamut) of the RV. And it is assumed that the color reproduction areas of the exclusive chart, that is, areas including color data of the above-mentioned RGB color space, which are associated with the color patches of the exclusive chart, are coincident to the first color reproduction area g1_2 representative of the color reproduction area (the color gamut) of the RV in the RGB color space.

Hereinafter, there will be explained a color conversion definition creating method according to the present embodiment of creating a color conversion definition SD for the scanner 1 using the exclusive chart, in conjunction with a flowchart shown in FIG. 8. Incidentally, according to a color conversion definition creating method, which will be described hereinafter, in order to improve a conversion accuracy of the finally obtained color conversion definition SD, there are introduced (C, M, Y) data and (C', M', Y') data, which will be described later, as well as the output data (R, G, B) of the scanner 1 and the calorimetric value data (L*, a*, b*). And there are determined the association between (R, G, B) data and (C, M, Y) data, the association between (C, M, Y) data and (C', M', Y') data, and the association between (C', M', Y') data and (L*, a*, b*) data. A combination of those associations determines the color conversion definition SD.

Figure 8:
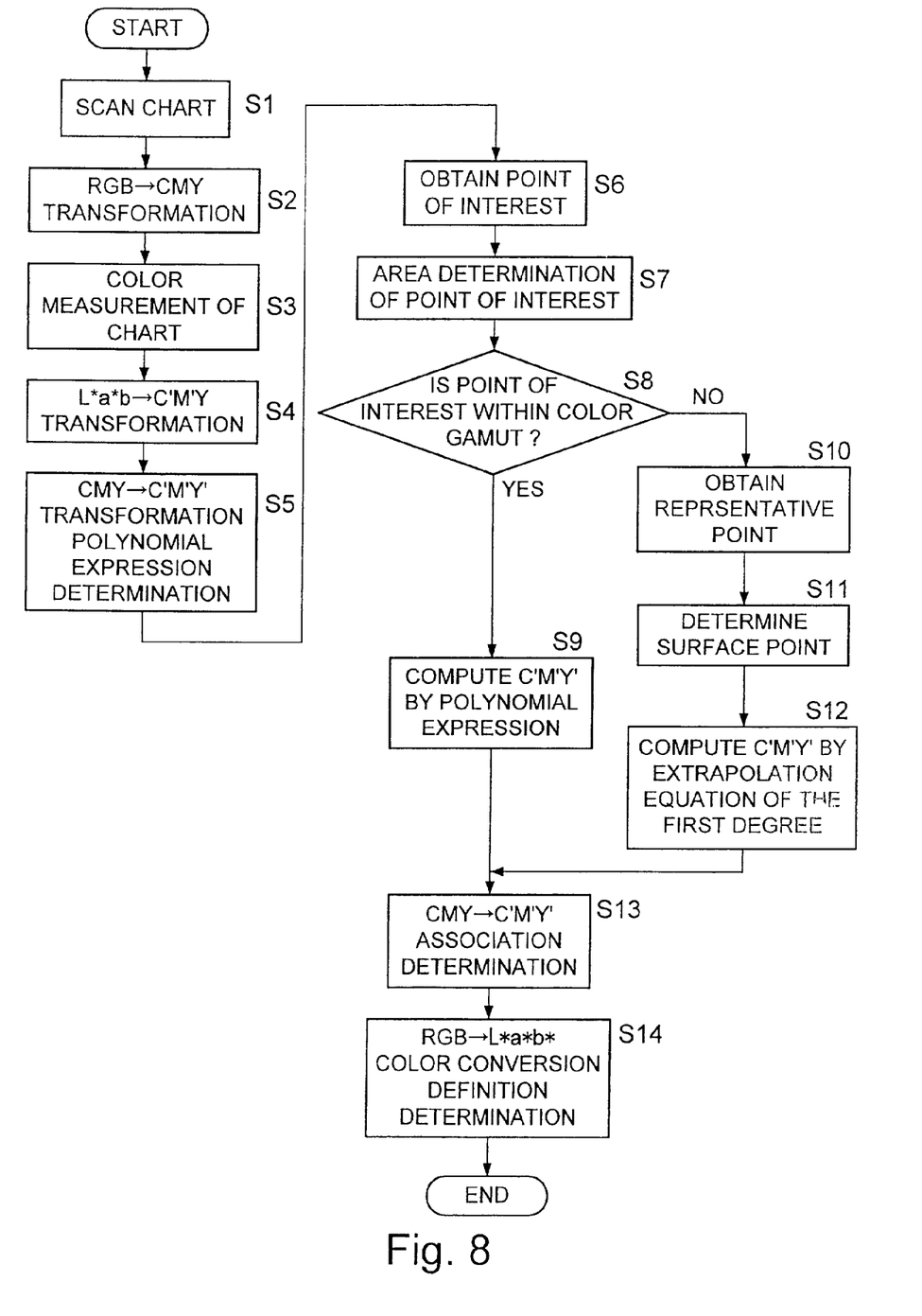
FIG. 8 is a flowchart useful for understanding a color conversion definition creating method according to the present embodiment of the present invention.

FIG. 8 is a flowchart useful for understanding a color conversion definition creating method according to the present embodiment of the present invention.

In step S1, the scanner 1 reads an exclusive chart created on the RV to derive RGB data associated with a plurality of color patches of the exclusive chart. The RGB data thus derived are represented by 729 pieces of coordinate points in the first color reproduction area g1_2 of the RGB color space shown in FIG. 3. Of 729 pieces of coordinate points, 386 pieces of coordinate points exist on a surface of the first color reproduction area g1_2. Next, the process goes to a step S2.

Figure 9:
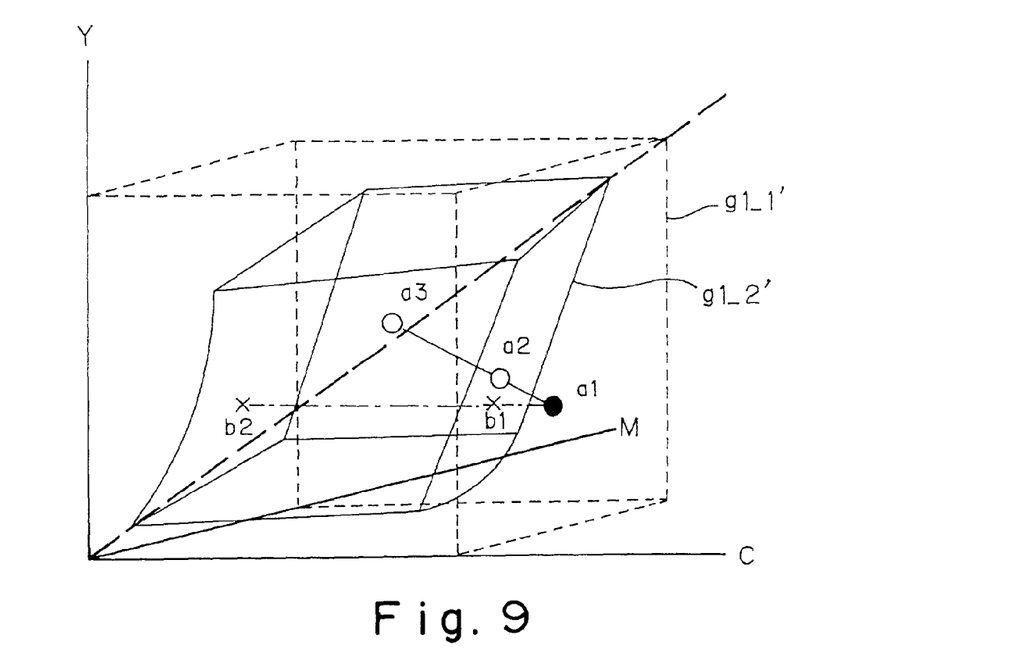
FIG. 9 is a view representative of a CMY space corresponding to the RGB color space shown in FIG. 3.

In the step S2, those 729 pieces of coordinate points of the RGB color space are converted into coordinate points of the CMY color space shown in FIG. 9.

FIG. 9 is a view representative of a CMY space corresponding to the RGB color space shown in FIG. 3.

A CMY space shown in FIG. 9 is represented in coordinates by three basic axes of a C-axis, an M-axis and a Y-axis. An area represented by a rectangular parallelepiped encircled by dotted lines in FIG. 9 is an area (a first definition area g1_1') corresponding to the first definition area g1_1 in the RGB space shown in FIG. 3. In FIG. 9, a distorted shape of area having 6 faces represented by solid lines, which is included in the first definition area g1_1', denotes a color reproduction area (a first color reproduction area g1_2') corresponding to the first color reproduction area g1_2 in the RGB space shown in FIG. 3.

Here, coordinate points (C, M, Y) in the CMY color space, which are associated with coordinate points (R, G, B) in the RGB color space, are expressed by the following transformation expressions.

$$C = F_C(R, G, B) \quad (1)$$

$$M = F_M(R, G, B) \quad (2)$$

$$Y = F_Y(R, G, B) \quad (3)$$

By way of example of those transformation expressions, for example, the following expressions are raised.

$$C = -\log_{10} R \quad (1')$$

$$M = -\log_{10} G \quad (2')$$

$$Y = -\log_{10} B \quad (3')$$

It is noted that the transformation expressions are not restricted to those formulas (1'), (2') and (3'). It is effective to select one in which good color reproduction quality can be provided in accordance with the color conversion definition SD finally obtained. Next, the process goes to a step S3.

In the step S3, an exclusive chart on the RV is measured by a calorimeter to obtain L*a*b* data associated with a plurality of color patches of the exclusive chart. The L*a*b* data thus obtained are represented by 729 pieces of coordinate points of the second color reproduction area g2_2 of the L*a*b* color space shown in FIG. 4. Of 729 pieces of coordinate points, 386 pieces of coordinate points exist on a surface of the second color reproduction area g2_2 of the L*a*b* color space. Next, the process goes to a step S4.

In the step S4, those 729 pieces of coordinate points of the L*a*b* color space are converted into coordinate points of the C'M'Y' color space shown in FIG. 10 in the manner as set forth below. The C'M'Y' color space denotes, as disclosed in Japanese Patent Application Laid Open Gazette Hei. 10-164352, a space of calorimetric END (Equivalent neural density) value (C'M'Y') of CMY, which is converted from calorimetric values such as (X, Y, Z) and (L*, a*, b*), and is free from a device dependency.

Figure 10:
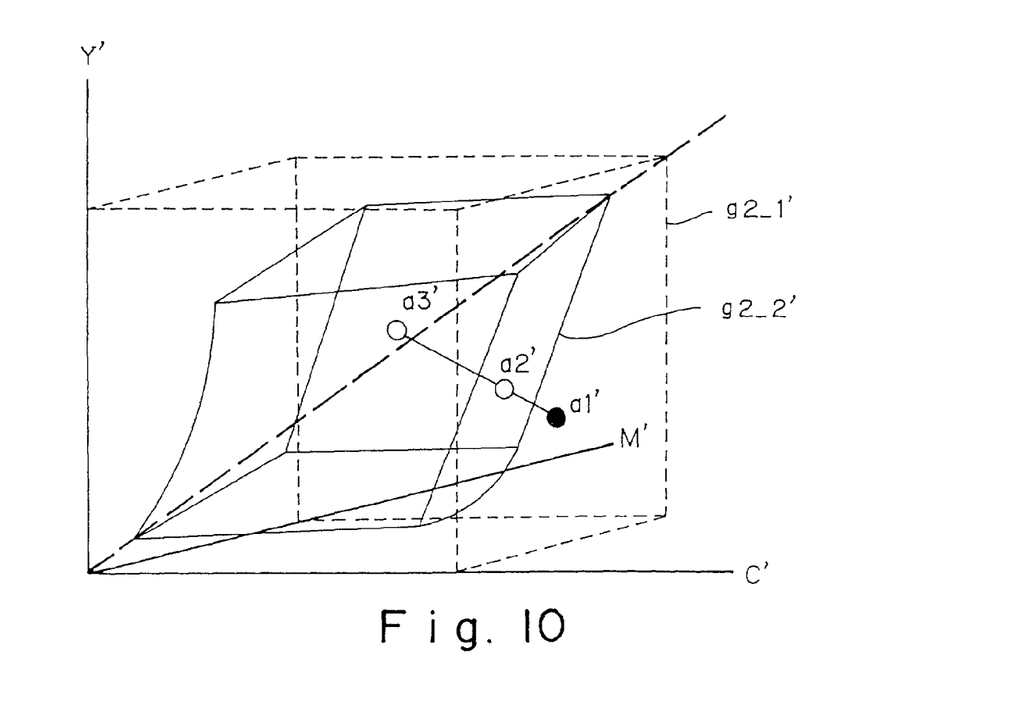
FIG. 10 is a view representative of a C'M'Y' space corresponding to the L*a*b* color space shown in FIG. 4.

FIG. 10 is a view representative of a C'M'Y' color space corresponding to the L*a*b* color space shown in FIG. 4.

A C'M'Y' color space shown in FIG. 10 is represented in coordinates by three basic axes of a C'-axis, an M'-axis and a Y'-axis. An area represented by a rectangular parallelepiped encircled by dotted lines in FIG. 10 is an area (a second definition area g2_1') corresponding to the second definition area g2_1 in the L*a*b* color space shown in FIG. 4. In FIG. 10, a distorted shape of area having 6 faces represented by solid lines, which is included in the second definition area g2_1', denotes a color reproduction area (a second color reproduction area g2_2') corresponding to the second color reproduction area g2_2 in the L*a*b* color space shown in FIG. 4.

Here, coordinate points (C', M', Y') in the C'M'Y' color space shown in FIG. 10, which are associated with the above-mentioned 729 pieces of coordinate points (L*, a*, b*) in the L*a*b* color space shown in FIG. 4, are expressed by the following transformation expressions.

$$C' = F_{C'}(L^*, a^*, b^*) \quad (4)$$

$$M' = F_{M'}(L^*, a^*, b^*) \quad (5)$$

$$Y' = F_{Y'}(L^*, a^*, b^*) \quad (6)$$

Those transformation expressions can be derived by way of example in the manner as set forth below. Incidentally, it is assumed that the L*a*b* color space to be dealt with here is a CIELAB color space.

First, the above-mentioned 729 pieces of coordinate points (L*, a*, b*) are converted into 729 pieces of coordinate points (X, Y, Z) in the XYZ color space using the following relations.

$$L^* = 116 \times f(Y/Y_n) - 16 \quad (á1)$$

$$a^* = 500 \times \{f(X/X_n) - f(Y/Y_n)\} \quad (á2)$$

$$b^* = 200 \times \{f(Y/Y_n) - f(Z/Z_n)\} \quad (á3)$$

Where the function f (t) used in the above relations is expressed by the following equation for the range: t>0.008856.

$F(t) = t^{1/3}$

For the range: t<0.008856

$f(t) = 7.787 \times t + 16/116$ (cf. Noboru Ohta : "Introduction to Color Reproduction Technology", CORONA PUBLISHING CO., LTD, pp.27 to 28 (1997)).

Next, 729 pieces of coordinate points (X, Y, Z) thus converted are converted into 729 pieces of coordinate points (C', M', Y') in the C'M'Y' color space in the manner as set forth below.

Figure 11:
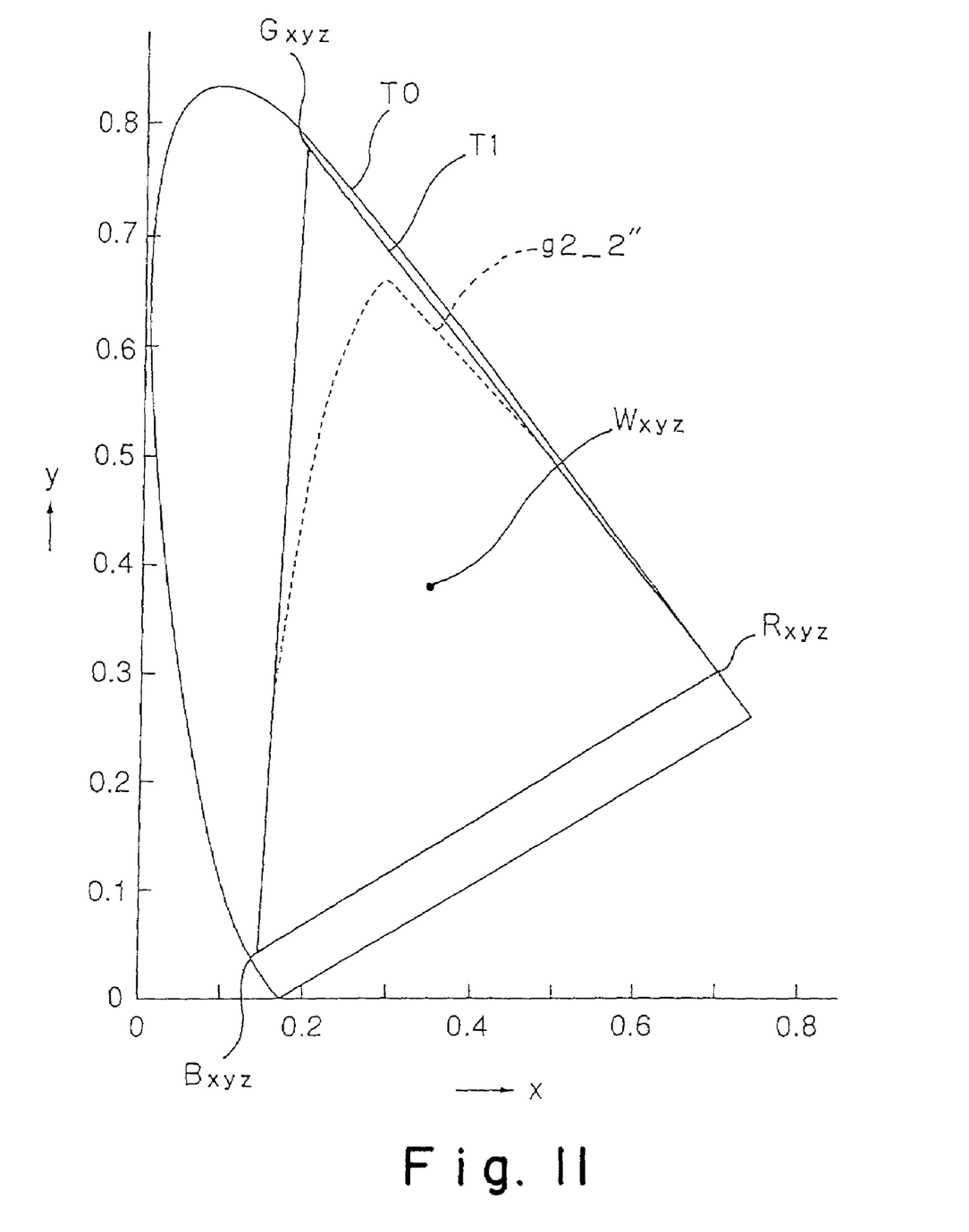
FIG. 11 is a view showing x-y chromaticity diagram.

FIG. 11 is a view showing x-y chromaticity diagram.

FIG. 11 shows a color reproduction area g2_2" corresponding to the second color reproduction area g2_2, which is encircled with dotted lines, in the entire color area TO surrounding all areas for existing colors.

Here, the relationship between the coordinate points (X, Y, Z) of the XYZ color space and the coordinate points (x, y) of the x-y chromaticity diagram is as follows.

$x = X/(X+Y+Z)$ $y = Y/(X+Y+Z)$

Incidentally, z chromaticity value is expressed by the following formula.

$Z = 1 - x - y = Z/(X+Y+Z)$

The z chromaticity value is unnecessary for a notation of the x-y chromaticity diagram of FIG. 11, but it is necessary for the later computation.

Next, a predetermined white point is determined on the x-y chromaticity diagram of FIG. 11. In the present embodiment, the following point $(x_w, y_w, z_w)$, which represents the chromaticity value of light $D_{50}$ of the auxiliary standard of CIE, is given as a white point $W_{xyz}$.

$(x_w, y_w) = (0.3457, 0.3586)$

Next, let us consider on the x-y chromaticity diagram an area T1 of a triangle having vertexes given by primary color points $R_{xyz}$, $G_{xyz}$ and $B_{xyz}$ representative of primary colors R, G and B, respectively, the area T1 including the above-mentioned color reproduction area g2_2'. Those three vertexes are set up in such a manner that the center of gravity becomes the white point $W_{xyz}$. It is preferable that the area T1 of the triangle is set up so as to include the above-mentioned color reproduction area g2_2' and to be minimum in its area. Here, the xyz chromaticity values of the primary color points $R_{xyz}$, $G_{xyz}$ and $B_{xyz}$ are represented by $(x_R, y_R, z_G)$, $(x_G, y_G, z_G)$ and $(x_B, y_B, z_B)$, respectively.

As will be seen also from the matter that the center of gravity of the primary color points $R_{xyz}$, $G_{xyz}$ and $B_{xyz}$ becomes the white point $W_{xyz}$ in the x-y chromaticity diagram, the x-y chromaticity diagram is a space representative of an additive mixture of RGB colors. For this reason, it is considered that points on the x-y chromaticity diagram are represented by for example a linear coupling of vectors from the original point O to directions of primary color points $R_{xyz}$, $G_{xyz}$ and $B_{xyz}$. When predetermined distance parameters R, G and B to the vector directions are introduced, the points on the x-y chromaticity diagram can be represented by coordinates (R, G, B) on the RGB space represented by those parameters. The coordinates (R, G, B) and the above-mentioned coordinates (X, Y, Z) representative of the same points as points represented by the coordinates (R, G, B) are associated with one another by the following linear transformation expressions (cf. Mituo Ikeda : "Introduction to Color Technology", ASAKURA BOOKSTORE CO., LTD, pp.125 to 130).

$R = a_{11}X + a_{12}Y + a_{13}Z$  (α4)

$G = a_{21}X + a_{22}Y + a_{23}Z$  (α5)

$B = a_{31}X + a_{32}Y + a_{33}Z$  (α6)

Regarding those expressions, with respect to white point $(x_w, y_w, z_w)$, $a_{11}x_w + a_{12}y_w + a_{13}z_w = 1$  (α7)

$a_{21}x_w + a_{22}y_w + a_{23}z_w = 1$  (α8)

$a_{31}x_w + a_{32}y_w + a_{33}z_w = 1$  (α9)

with respect to R-primary color point $(x_R, y_R, z_R)$, $a_{21}x_R + a_{22}y_R + a_{23}z_R = 0$  (α10)

$a_{31}x_R + a_{32}y_R + a_{33}z_R = 0$  (α11)

with respect to G-primary color point $(x_G, y_G, z_G)$, $a_{11}x_G + a_{12}y_G + a_{13}z_G = 0$  (α12)

$a_{31}x_G + a_{32}y_G + a_{33}z_G = 0$  (α13)

with respect to B-primary color point $(x_B, y_B, z_B)$, $a_{11}x_B + a_{12}y_B + a_{13}z_B = 0$  (α14)

$a_{21}x_B + a_{22}y_B + a_{23}z_B = 0$  (α15)

the above equations are applied, respectively.

In those equations (α7)–(α15), taking notice of the equations including $a_{11}$, $a_{12}$, $a_{13}$, there exist the following three equations.

$a_{11}x_w + a_{12}y_w + a_{13}z_w = 1$ $a_{11}x_G + a_{12}y_G + a_{13}z_G = 0$ $a_{11}x_B + a_{12}y_B + a_{13}z_B = 0$

Solving those three simultaneous equations makes it possible to determine $a_{11}$, $a_{12}$, $a_{13}$. Likewise, taking notice of the equations including $a_{21}$, $a_{22}$, $a_{23}$, there exist three equations. Also taking notice of the equations including $a_{31}$, $a_{32}$, $a_{33}$, there exist three equations. Solving those simultaneous equations makes it possible to determine factors $a_{ij}$ (I, j=1, 2, 3) appearing in the equations (α4)–(α6).

The coordinates (X, Y, Z) are converted into coordinates (R, G, B) in accordance with the equations (α4)–(α6) having the factors $a_{ij}$ thus determined. The coordinates (R, G, B) are converted into coordinates (C', M', Y') in accordance with the following equations.

$C' = -\log_{10}(R/R_w)$  (16)

$M' = -\log_{10}(G/G_w)$  (17)

$Y' = -\log_{10}(B/B_w)$  (18)

Where constants $R_w$, $G_w$ and $B_w$ represent values of R, G and B, which are determined by a substitution of the white point $W_{xyz}$ for the equations (α4)–(α6), respectively.

As mentioned above, combination of the equations (α1)–(α3), the equations (α4)–(α6), and the equations (α16)–(α18) may derive the transformation expressions (4)–(6) to determine the coordinates points (C', M', Y') in the C'M'Y' color space, which associate with coordinates points (L*, a*, b*) of the L*a*b* color space. Next, the process goes to a step S5.

In the step S5, there is determined the association between the coordinates points (C, M, Y) in the CMY color space determined in the step S2, which associate with color data (R, G, B) obtained through reading color patches of the exclusive chart CT1 by the scanner 1, and the coordinates points (C', M', Y') in the C'M'Y' color space determined in the step S4, which associate with colorimetric values (L*, a*, b*) obtained through color measurement of color patches of the exclusive chart CT1. This association is expressed by the following three polynomial expressions.

$$C' = \sum_{i,j,k=0}^{i+j+k \leq n} A_{ijk}^{(1)} C^i M^j Y^k \quad (7)$$

$$M' = \sum_{i,j,k=0}^{i+j+k \leq n} A_{ijk}^{(2)} C^i M^j Y^k \quad (8)$$

$$Y' = \sum_{i,j,k=0}^{i+j+k \leq n} A_{ijk}^{(3)} C^i M^j Y^k \quad (9)$$

C', M' and Y' shown in the left sides of the expressions (7)–(9) represent coordinate components of the coordinates points (C', M', Y') in the C'M'Y' color space corresponding to the coordinates points (C, M, Y), which exist inside the first color reproduction area g1_2' of the CMY color space. The right sides of the expressions (7)–(9) represent n-order of polynomial expressions of variables C, M and Y representative of coordinate components in the CMY color space. For example, in the expression (7), the term of the polynomial expression is represented by $A^{(1)}_{ijk} C^i M^j Y^k$, where $A^{(1)}_{ijk}$ denotes a coefficient, and indexes i, j and k are integers not less than 0. The sum (i+j+k) of these indexes is not more than the maximum order n. In the expressions (8) and (9), coefficients of terms of the polynomial expressions are represented by $A^{(2)}_{ijk}$ and $A^{(3)}_{ijk}$, respectively. Precision of conversion represented by the expressions (7)–(9) is improved, as the maximum order n is larger. According to the present embodiment, the maximum order n is given by n=7.

It is preferable that the coordinates points (C', M', Y'), which are obtained by substituting 729 pieces of coordinate points (C, M, Y) in the first color reproduction area g1_2' of the CMY color space, determined in the step S2, for C, M and Y of the right sides of the expressions (7)–(9), reproduce 729 pieces of coordinate points (C', M', Y') obtained in the step S2, corresponding to the coordinates points (C, M, Y). The coefficients $A^{(1)}_{ijk}$, $A^{(2)}_{ijk}$ and $A^{(3)}_{ijk}$ are determined by for example, the regression analysis so that the reproduction quality is extremely enhanced when those coordinate points (C', M', Y') obtained by the expressions (7)–(9) are subjected to averaging throughout the coordinate points. Introducing the coefficients $A^{(1)}_{ijk}$, $A^{(2)}_{ijk}$ and $A^{(3)}_{ijk}$ thus determined into the expressions (7)–(9) determines a transformation polynomial expressions defining with great accuracy a transformation from the coordinates points (C, M, Y) in the CMY color space to the coordinate points (C', M', Y') in the C'M'Y' color space. Next, the process goes to a step S6.

In the step S6, of the first definition area g1_1 in the RGB color space shown in FIG. 3, the above-mentioned points of interest defining the color conversion definition SD are obtained. Hereinafter, while an explanation will be made noticing one point ($R_c$, $G_c$, $B_c$) of interest of those points of interest, the similar operation to that of the point ($R_c$, $G_c$, $B_c$) of interest are applied with respect to points of interest other than the point ($R_c$, $G_c$, $B_c$) of interest, too. The process goes to steps S7 and S8.

In the steps S7 and S8, it is decided whether the points of interest obtained in the step S6 exist inside or outside the first color reproduction area g1_2.

When it is decided that a certain point ($R_c$, $G_c$, $B_c$) of interest exists inside (outside) the first color reproduction area g1_2, a point ($C_c$, $M_c$, $Y_c$) of interest in the CMY space shown in FIG. 9, which is associated with the point ($R_c$, $G_c$, $B_c$) of interest, also exists inside (outside) the first color reproduction area g1_2' in the CMY space. Thus, this decision is made by determining whether the point ($C_c$, $M_c$, $Y_c$) of interest exists inside the first color reproduction area g1_2'.

An example of the procedure of the determination will be explained referring to FIG. 9 again, hereinafter.

FIG. 9, which is representative of the CMY space, shows a black dot a1, two white circles a2 and a3, and two x marks b1 and b2, which are not shown in FIG. 3. The white circles a2 and a3 have nothing to do with the determination. Thus, it will be described later. The black dot a1 denotes the point ($C_c$, $M_c$, $Y_c$) of interest.

A perpendicular line, which is represented by a dashed line in FIG. 9, is drawn from the black dot a1 representative of the point ($C_c$, $M_c$, $Y_c$) of interest on an M-Y plane including an M-axis and Y-axis. In this case, there are two intersection points between the perpendicular line and the first color reproduction area g1_2'. The x marks b1 and b2 represent the two intersection points. In case shown in FIG. 9, C-coordinate values of two intersection points represented by the x marks b1 and b2 are smaller than C-coordinate values of the point ($C_c$, $M_c$, $Y_c$) of interest represented by the black dot a1. It is understood from large-small relations of the coordinate values that the point of interest represented by the black dot a1 exists outside the first color reproduction area g1_2'.

Generally, perpendicular lines are drawn on not only the M-Y plane, but also a C-M plane and a Y-C plane, respectively, and large-small relations of coordinate values between coordinate values of the point ($C_c$, $M_c$, $Y_c$) of interest and coordinate values of intersection points of the perpendicular lines and the first color reproduction area g1_2' are investigated. Thus, it is decided whether the point ($C_c$, $M_c$, $Y_c$) of interest exists inside or outside the first color reproduction area g1_2'.

When it is decided that the point ($C_c$, $M_c$, $Y_c$) of interest exists inside the first color reproduction area g1_2', the process goes to a step S9. On the other hand, when it is decided that the point ($C_c$, $M_c$, $Y_c$) of interest exists outside the first color reproduction area g1_2', the process goes to steps S10 to S12.

In the step S9, the coordinate point ($C_c'$, $M_c'$, $Y_c'$) in the C'M'Y' color space, corresponding to the point ($C_c$, $M_c$, $Y_c$) of interest, in the event that the point ($C_c$, $M_c$, $Y_c$) of interest exists inside the first color reproduction area g1_2', is computed in accordance with the transformation polynomial expressions determined in the step S5. Next, the process goes to a step S13.

In step 10 to step 12, the coordinate point ($C_c'$, $M_c'$, $Y_c'$) in the C'M'Y' color space, corresponding to the point ($C_c$, $M_c$, $Y_c$) of interest, in the event that the point ($C_c$, $M_c$, $Y_c$) of interest exists outside the first color reproduction area g1_2', is determined in accordance with the extrapolation of the first degree as set forth below.

Of the step 10 to step 12, in the step 10 a representative point ($C_a$, $M_a$, $Y_a$), which is one point inside the first color reproduction area g1_2', is determined to be used in the extrapolation of the first degree. Here, it is assumed that the white circle a3 shown in FIG. 9 is selected as the representative point, and a distance between the representative point represented by the white circle a3 and the point of interest represented by the black dot a1 is expressed by D'. Incidentally, here, the same one representative point is used for all the points of interest of the exterior of the first color reproduction area g1_2'. Next, the process goes to a step S11.

In the step S11, there is determined a surface point ($C_b$, $M_b$, $Y_b$) existing on a straight line coupling the point ($C_c$, $M_c$, $Y_c$) of interest represented by the black dot a1 shown in FIG. 9 with the representative point ($C_a$, $M_a$, $Y_a$) represented by the white circle a3 shown in FIG. 9, which is determined in the step S9, and on a surface of the first color reproduction area g1_2' or in the vicinity of the surface inside the first color reproduction area g1_2'. The surface point is represented by the white circle a2. A distance between the surface point represented by the white circle a2 and the representative point represented by the black dot a1 is expressed by $D_s$.

A set up of the surface point is performed in such a manner that for example, a point bringing close to the representative point represented by the white circle a3 from the point of interest represented by the black dot a1 a predetermined distance at a time is set up, and it is determined in a similar fashion to that of the step S3 as to whether the point thus set up is inside or outside the first color reproduction area g1_2', and as a result, a point, which is involved in a time when it is first determined that the point thus set up is inside the first color reproduction area g1_2', is decided as the surface point.

Before dealing with a step S12, there will be described points in the C'M'Y' color space, which are associated with the point of interest represented by the black dot a1, the surface point represented by the white circle a2, and the representative point represented by the white circle a3 in the CMY color space, respectively, in conjunction with FIG. 10.

FIG. 10, which is representative of the C'M'Y' color space, shows a black dot a1' and two white circles a2' and a3'. The black dot a1' is a point corresponding to the point ($C_c$, $M_c$, $Y_c$) of interest, and the coordinates ($C_c'$, $M_c'$, $Y_c'$) of this point are determined in the step S11.

The white circle a2' represents a point in the C'M'Y' color space corresponding to the surface point ($C_b$, $M_b$, $Y_b$) represented by the white circle a2 shown in FIG. 9. Here, the point in the C'M'Y' color space is defined by the coordinates ($C_b'$, $M_b'$, $Y_b'$). The coordinates are determined from the coordinates of the surface point using the transformation polynomial expression determined in the step S5.

The white circle a3' represents a point in the C'M'Y' color space corresponding to the representative point ($C_a$, $M_a$, $Y_a$) represented by the white circle a3 shown in FIG. 9. Here, the point in the C'M'Y' color space is defined by the coordinates ($C_a'$, $M_a'$, $Y_a'$). The coordinates are determined from the coordinates of the representative point using the transformation polynomial expression determined in the step S5.

In the step S12, the coordinates ($C_c'$, $M_c'$, $Y_c'$) of the point a1' in the C'M'Y' color space, corresponding to the point a1 of interest located at coordinates ($C_c$, $M_c$, $Y_c$) in the CMY color space is computed in accordance with the extrapolation of the first degree as set forth below.

$$C_c' = C_a' + \left(\frac{D'}{D_s}\right) \cdot (C_b' - C_a') \quad (10)$$

$$M_c' = M_a' + \left(\frac{D'}{D_s}\right) \cdot (M_b' - M_a') \quad (11)$$

$$Y_c' = Y_a' + \left(\frac{D'}{D_s}\right) \cdot (Y_b' - Y_a') \quad (12)$$

The three equations (10) to (12) are extrapolation equations for determining the coordinates ($C_c'$, $M_c'$, $Y_c'$) of the point a1' corresponding to the point a1 of interest in such a manner that a ratio of a distance $D_s$ between the representative point a3 and the surface point a2 in the CMY color space and a distance D' between the representative point a3 and the point a1 of interest in the CMY color space is equal to a ratio of a distance between the point a3' of the coordinates ($C_a'$, $M_a'$, $Y_a'$) corresponding to the representative point a3 and the point a2' of the coordinates ($C_b'$, $M_b'$, $Y_b'$) corresponding to the surface point a2 and a distance between the point a3' of the coordinates ($C_a'$, $M_a'$, $Y_a'$) corresponding to the representative point a3 and the point a1' of the coordinates ($C_c'$, $M_c'$, $Y_c'$) corresponding to the point a1 of interest in the C'M'Y' color space. Here, since the ratio of $D'/D_s$ is rewritten in form of $(C_c-C_a)/(C_b-C_a)$, the right side of each of the three equations (10) to (12) is the extrapolation equation of the first degree comprising the linear expressions of $C_c$, $M_c$, $Y_c$. The coordinates ($C_c'$, $M_c'$, $Y_c'$) corresponding to the point a1' in the C'M'Y' color space is determined from the coordinates ($C_c$, $M_c$, $Y_c$) of the point a1 of interest in the equations (10) to (12). Next, the process goes to a step S13.

In the step S13, there is determined the association between the coordinates ($C_c$, $M_c$, $Y_c$) of the point of interest obtained in the step S6 and the coordinates ($C_c'$, $M_c'$, $Y_c'$) of the point in the C'M'Y' color space corresponding to the point of interest, which are computed in the steps S9 and S12. Next the process goes to a step S14.

In the step S14, first, there are obtained coordinates ($R_c$, $G_c$, $B_c$) of the point of interest in the RGB color space corresponding to the point of the coordinates ($C_c$, $M_c$, $Y_c$), of the association between the coordinates ($C_c$, $M_c$, $Y_c$) obtained in the step S13 and the coordinates ($C_c'$, $M_c'$, $Y_c'$). The coordinates ($R_c$, $G_c$, $B_c$) of the point of interest has been already obtained in the step S6. Next, coordinates ($L_c^*$, $a_c^*$, $b_c^*$) of the point in the L*a*b* space corresponding to the point of the coordinates ($C_c'$, $M_c'$, $Y_c'$), of this association is determined in accordance with the inverse transformation of the transformation represented by the equations (4) to (6). And from the coordinates ($C_c$, $M_c$, $Y_c$) and the coordinates ($L_c^*$, $a_c^*$, $b_c^*$) thus determined, the association between the coordinates ($R_c$, $G_c$, $B_c$) of the point of interest in the RGB color space and the coordinates ($L_c^*$, $a_c^*$, $b_c^*$) of the point in the L* a* b* space corresponding to the point of interest is determined.

The association as mentioned above is determined for the coordinates ($R_c$, $G_c$, $B_c$) of all the points of interest throughout inside and outside the first color reproduction area g1_2' of the first definition area g1_1' in the RGB color space, so that the color conversion definition SD for converting the coordinates ($R_c$, $G_c$, $B_c$) of all the points of interest into the associated coordinates ($L_c^*$, $a_c^*$, $b_c^*$) is determined.

According to the color conversion definition creating method of the present embodiment, as mentioned above, there is used the exclusive chart CT1 having the color patches, which are created in accordance with much data in the vicinity of the boundary of the color area represented by the rectangular parallelepiped shown in FIG. 7 including all vertexes of the rectangular parallelepiped and the intermediate points. This feature makes it possible to perform with great accuracy a creation of a color conversion definition SD near or outside the boundary of the first definition area g1_1 and the second definition area g2_2.

In the event that a three-dimensional look-up-table (3D-LUT), which is representative of the color conversion definition SD determined using the exclusive chart CT1, is formed, the 3D-LUT is very large in size having at least 729 ($729=9^3$:the number of color patches) pieces of data of a set of ($R_c$, $G_c$, $B_c$, $L_c^*$, $a_c^*$, $b_c^*$) comprising gradation values $R_c$, $G_c$, $B_c$, $L_c^*$, $a_c^*$, $b_c^*$ having 10 bits (1024) of gradation, for instance. On the other hand, according to a color conversion definition creating method of the present embodiment, storage of the equations (1) to (12) and the coefficients of the polynomial expressions of the equations (7) to (9) makes it possible to create the color conversion definition SD in accordance with the equations and the coefficients thus stored, and thereby greatly saving the memory resource of the personal computer.

Table 1 shows a comparison result between a case where the above-mentioned color conversion definition creation is performed using the conventional IT 8 charts and a case where the above-mentioned color conversion definition creation is performed using the exclusive chart of the present embodiment.

TABLE 1

| | Chart A (Exclusive chart) | Chart B (IT 8) | Chart C (IT 8) |
|---|---|---|---|
| Number of patches | 729 | 288 | 288 |
| Algorithm | Polynomial expression of degree seven + α | Polynomial expression of degree three | Ambiguity |
| Average difference of 288 colors | 1.8 | 1.9 | 4.6 |
| Average difference of 3375 colors | 1.7 | 6.5 | 12.0 |

The top stage of Table 1 shows three chart names, chart A, chart B and chart C. Chart A is a color chart corresponding to the exclusive chart of the present embodiment. Chart B and Chart C represent IT8 chart. The left column shows items such as the number of patches, algorithm, an average difference of 288 colors, and an average difference of 3375 colors. Hereinafter, there will be described those items for the three charts.

With respect to the number of patches, the chart A is 729, the chart B and chart C are 288. While the chart B is the same as the chart C in the number of patches, the chart B and chart C are mutually different from one another in a maker inherent color since the makers are different.

The algorithm shows a computation used when a color conversion definition is created using those charts. With respect to the chart A, in a similar fashion to that of a color conversion definition creation of the present embodiment, a color conversion definition is created, within the color reproduction area, by using polynomial expression of degree seven, and out of the color reproduction area, by performing the extrapolation of the first degree. With respect to the chart B, a color conversion definition is created, within and out of the color reproduction area, by using polynomial expression of degree three. For those charts, there are adopted algorithms that are considered to be most suitable for those charts. With respect to the chart C, the algorithm is ambiguity.

A new color chart having color patches of 288 colors, different from the charts as mentioned above, is prepared. And there is measured 288 colors of color differences obtained through a comparison of 288 colors of L*a*b* data, wherein CMY data obtained through reading the prepared color chart by a scanner are converted in accordance with the color conversion definition obtained using the charts A, B and C for each chart, with 288 colors of L*a*b* data obtained through a color measurement of the prepared color chart. With respect to an average of the color difference of 288 colors of L*a*b* data, it is 4.6 for the chart C, which is relatively large; 1.9 for the chart B, which is relatively small; and 1.8 for the chart A, which is relatively further small.

Likewise, a new color chart having color patches of 3375 colors and color differences are measured on this color chart, too. With respect to an average of the color difference of 3375 colors of L*a*b* data corresponding to the color patches of 3375 colors, it is 12.0 for the chart C, which is very large; 6.5 for the chart B, which is relatively large; and 1.7 for the chart A corresponding to the exclusive chart of the present embodiment, which is small.

As seen from the result as mentioned above, the color conversion definition created using the exclusive chart of the present embodiment makes it possible to perform with great accuracy a color conversion which brings about a very small color difference.

According to the present embodiment, there is dealt with a color conversion definition between a scanner output data represented by coordinate values in the RGB color space of the scanner and calorimetric value data represented by coordinate values in the L*a*b* color space. It should be noted, however, that a color conversion definition creating method of the present invention is not restricted to the color conversion definition between those color spaces, and it is acceptable that a color conversion definition creating method of the present invention is applied to a creation of a color conversion definition between general two color spaces.

Further, according to a color conversion definition creating method of the present embodiment, the extrapolation of the first degree as mentioned above is performed to create a color conversion definition outside the color reproduction area. For this reason, the mutual positional relationship between two surface points associated with two points of interest is maintained in the two points of interest, too. Thus, a color conversion definition, which is created in accordance with a color conversion definition creating method of the present embodiment, involves no gradation inversion as mentioned above, and has consistency on a physical basis. The exclusive chart of the present embodiment brings much color data in the vicinity of the boundary of the color reproduction area, and thus it is suitable as a color chart for creating with great accuracy a color conversion definition outside the color reproduction area.

As mentioned above, according to the present invention, there are provided a color chart suitable for creating with great accuracy a color conversion definition, and a color conversion definition creating method of performing a creation of a color conversion definition using the color chart.

While the present invention has been described with reference to the particular illustrative embodiments, it is not to be restricted by those embodiments except as defined in the appended claims. It is to be appreciated that those skilled in the art can change or modify the embodiments without departing from the scope of the present invention as defined in the appended claims.

What is claimed is:

1. A color chart, for creating a color conversion definition for converting first color data representative of coordinate points in a first color space depending on an input device for entering image to obtain image data into second color data representative of coordinate points in a second color space independent of devices, in which a plurality of color patches different in color is arranged, said color chart comprising:

color patches associated with all vertexes of a rectangular parallelepiped defined by a base coloring value ($QC_b$, $QM_b$, $QY_b$) comprising:

combinations of minimum coloring values $QC_b$, $QM_b$ and $QY_b$ of monochromes of cyan, magenta and yellow in a coloring value space represented by three axes of coloring values of cyan, magenta and yellow, a maximum coloring value $QC_{max}$ of monochrome of cyan, a maximum coloring value $QC_{max}$ of monochrome of magenta M, and a maximum coloring value $QY_{max}$ of monochrome of yellow Y in the coloring value space and;

a color patch associated with an intermediate point located between two vertexes on a straight line coupling the two vertexes with one another, even if any two vertexes of the rectangular parallelepiped are selected.

2. The color chart for creating the color conversion definition of claim 1, with color patches associated with all vertexes of the rectangular parallelepiped, wherein:

($QC_b$, $QM_{max}$, $QY_{max}$) represents the maxiumum coloring value of a saturated color Red;

($QC_{max}$, $QM_b$, $QY_{max}$) represents the maximum coloring value of a saturated color Green; and ($QC_{max}$, $QM_{max}$, $QY_b$) represents the maximum coloring value of a saturated color Blue.

3. The color chart of claim 1, wherein the color chart provides a value for an exterior point located outside a reproduction area and where the value is based on a correlation between the exterior point and the reproduction area.

4. The color chart of claim 1, wherein the color patches associated with all vertexes of a rectangular parallelepiped are defined by a base coloring percentage.

5. A color conversion definition creating method of creating a color conversion definition for converting first color data representative of coordinate points in a first color space depending on an input device for entering image to obtain image data into second color data representative of coordinate points in a second color space independent of devices, wherein a color chart is adopted to obtain the second color data representative of coordinate points in the second color space associated with a plurality of color patches constituting said color chart, and also to obtain the first color data representative of coordinate points in the first color space associated with a plurality of color patches constituting said color chart, through inputting said color chart to said input device, said color chart comprising:

color patches associated with all vertexes of a rectangular parallelepiped defined by a base coloring value ($QC_b$, $QM_b$, $QY_b$) comprising:

combinations of minimum coloring values $QC_b$, $QM_b$ and $QY_b$ of monochromes of cyan, magenta and yellow in a coloring value space represented by three axes of coloring values of cyan, magenta and yellow, a maximum coloring value $QC_{max}$ of monochrome of cyan, a maximum coloring value $QM_{max}$ of monochrome of magenta M, and a maximum coloring value $QY_{max}$ of monochrome of yellow Y in the coloring value space and;

a color patch associated with an intermediate point located between two vertexes on a straight line coupling the two vertexes with one another, even if any two vertexes of the rectangular parallelepiped are selected, and the color conversion definition is created by association of said first color data with said second color data.

6. The color conversion definition creating method of creating the color conversion definition of claim 5, wherein determining a value of an exterior point of a color reproduction area is based on, $$C_c = C_a + (D) \times (C_b - C_a); \quad (1)$$

$$(D)$$

$$M_c = M_a + (D) \times (M_b - M_a); \quad (2)$$

$$(D_s)$$

$$Y_c = Y_a + (D) \times (Y_b - Y_a); \quad (3)$$

$$(D_s)$$

where: ($C_a$, $M_a$, $Y_a$) is a representative point inside the color reproduction area;

($C_b$, $M_b$, $Y_b$) is a surface point of the color reproduction area;

($C_c$, $M_c$, $Y_c$) is the exterior point outside of the reproduction area;

$D_s$ is a distance between the representative point and the surface point; and

D is a distance between the representative point and the exterior point.

7. The color conversion definition creating method of claim 5, with the color chart having color patches associated with all vertexes of the rectangular parallelepiped, wherein:

($QC_b$, $QM_{max}$, $QY_{max}$) represents the maxiumum coloring value of a saturated color Red;

($QC_{max}$, $QM_b$, $QY_{max}$) represents the maximum coloring value of a saturated color Green; and ($QC_{max}$, $QM_{max}$, $QY_b$) represents the maximum coloring value of a saturated color Blue.

* * * * *